3,503,930
MERCAPTAN POLYMERS

Lester Morris and Irvin P. Seegman, Encino, and Ron E. Thompson, Northridge, Calif., assignors to Products Research & Chemical Corporation, Burbank, Calif., a corporation of California
No Drawing. Continuation-in-part of application Ser. No. 443,699, Mar. 29, 1965. This application Mar. 20, 1968, Ser. No. 714,460
The portion of the term of the patent subsequent to Mar. 4, 1986, has been disclaimed
Int. Cl. C08g 23/00, 23/20
U.S. Cl. 260—48    3 Claims

ABSTRACT OF THE DISCLOSURE

Mercaptan terminated liquid polyethers having the general formula $R-[A-O-B(SH)_{m-1}]_n$, wherein R is lower alkyl having from 2 to 6 carbon atoms, A is polyalkylene oxide or a mixture of polyalkylene oxides having alkyl radicals ranging from 2 to 4 carbon atoms, the number of repeating alkylene units ranging from about 2 to 200, B is an organic radical having an olefinic double bond alpha to the oxygen atom, $m$ is an integer ranging from 2 to 4 and $n$ is an integer ranging from 2 to 4. Halogenated terminated polyethers having the formula $R[A-O-B(X)_{m-1}]_n$, wherein R, A, B, $m$ and $n$ have the same meanings as designated above and X is halogen. A method for producing such polymers which includes (1) reacting a polyalkylene oxide having from 2 to 4 primary or secondary hydroxyl groups with an alkali metal or alkali metal hydride, (2) reacting the thus formed metal alkoxide with an organic compound containing from 2 to 4 halogen atoms, at least one of the halogen atoms being located alpha to an olefinic double bond, (3) reacting the product of (2) with a sulfur containing compound, and, if necessary, (4) hydrolyzing the product of (3) with an alkaline compound and neutralizing the excess alkalinity.

RELATED APPLICATIONS

This application is a continuation-in-part application of our copending application Ser. No. 443,699, filed Mar. 29, 1965, now Patent 3,431,239.

BACKGROUND OF THE INVENTION

Organic liquid materials capable of being vulcanized or "cured" to solid rubbery elastomers at ambient temperatures have been found valuable in a wide variety of applications, particularly in the formulation of sealants, protective coatings and adhesives, where high resistance to oxygen, ozone, organic solvents, oils, and fuels is required. Economic considerations have limited the use of such organic materials essentially to two types, namely mercaptan terminated polysulfides and polyurethanes.

The production of mercaptan terminated liquid polysulfides, however, involves expensive equipment and costly processing steps. In a typical synthesis, mixtures of polychloro ethers and sodium tetrasulfide are emulsified in water to form a solid dispersion which is subsequently depolymerized by the introduction of selected mercaptans to form an equilibrium mixture. The product is then washed and dried. The resultant yields are very low, generally of the order of about 50% of the added components.

The use of polyurethanes is similarly subject to attendant disadvantages, namely in the requirement of a primer and in the tendency of polyurethanes to blow in the presence of water.

Other organic liquid materials have found only limited application due to very low yields and low conversion efficiencies in their methods of production resulting in undesirable by-products and considerable unreacted materials.

SUMMARY OF THE INVENTION

The present invention is based upon the surprising discovery that liquid mercaptan terminated polyethers can be produced economically and in extremely high yields. The novel mercaptan terminated polyethers of this invention are unusually light in color, free of mercaptan odors, and exhibit excellent adhesion, excellent water, weather and heat resistance, as well as other superior properties, including resistance to thermal softening, compression set and hydrocarbon solvents.

The present invention also provides a novel reactive halogen intermediate compound which renders the production of the novel liquid mercaptan terminated polyethers very economical to produce.

It is thus an object of this invention to embody mercaptan terminated liquid polyethers derived from polyalkylene oxide glycols.

Another object of this invention is to provide and disclose a method of producing mercaptan terminated liquid polyethers in high yields and at high conversion efficiencies, utilizing inexpensive processing equipment and low cost processing steps.

A further object of this invention is to disclose and provide reactive intermediate halogenated compounds which are useful in the economical production of mercaptan terminated liquid polyethers.

Another and further object of our invention is to embody a method of curing mercaptan terminated polyethers to rubbery elastomers having superior properties, including excellent adhesion and resistance to thermal softening, compression set, oxygen, ozone, organic solvents, oils and fuels.

DESCRIPTION OF THE PREFERRED EMBODIMENTS

The present invention provides mercaptan liquid polyethers having the general formula

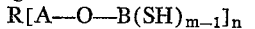

wherein R is lower alkyl having from 2 to 6 carbon atoms, A is polyalkylene oxide or a mixture of polyalkylene oxides having alkyl radicals of from 2 to 4 carbon atoms, the number of repeating alkylene units ranging from about 2 to 200, B is an organic radical having an olefinic double bond alpha to the oxygen atom, $m$ is an integer of from 2 to 4, and $n$ is an integer of from 2 to 4.

The present invention also provides a novel intermediate for producing the mercaptan terminated liquid polyethers. These novel halogenated reactant intermediates have the formula $R[A-O-B(X)_{m-1}]_n$, wherein R, A, B, $m$ and $n$ have the same meanings as indicated above and X is halogen (e.g. F, Cl, Br, or I).

The method of the present invention involves reacting a metal or metal hydride, preferably an alkali metal or hydride thereof in dispersion, with a polyalkylene oxide containing primary or secondary hydroxyl groups, preferably a diol or triol, to form a metal alkoxide. The reaction can be shown chemically as follows:

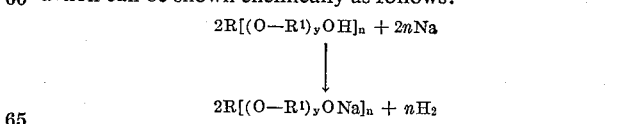

wherein R is lower alkyl of from 2 to 6 carbon atoms, $R^1$ is alkylene of from 2 to 4 carbon atoms, $y$ is an integer of from 2 to 200 and $n$ is an integer of from 2 to 4.

The sodium alkoxide can in turn be reacted with an organic compound containing from 2 to 4 halogen atoms, at least one of the halogen atoms being alpha to an olefinic double bond. By olefinic double bond is meant any two carbon atoms bonded together with double bond characteristics. For example, the carbon atoms in aromatic rings such as benzene have such double bond characteristics. The chemical reaction between the metal alkoxide derivative and the polyhalogen organic compound can be exemplified as follows:

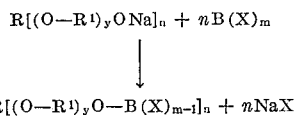

wherein R, R¹, X, B, $m$, and $n$ have the same significance as set forth above.

The reactive halogen intermediate is in turn reacted with a suitable sulfur containing compound, the sulfur replacing the halogen atom or atoms in the halogenated intermediate to form the liquid mercaptan terminated polyether. Sometimes the reaction product of the sulfur compound with the reactive halogenated intermediate forms a salt which must be hydrolyzed. At other times, the sulfur containing compound has a hydrolyzable group attached to the sulfur atom. In order to form the final products of this invention the hydrolyzable group must be hydrolyzed. If, on the other hand, a salt of $H_2S$ (preferably an alkali metal salt such as NaHS) is utilized there is no need to hydrolyze the product formed because this product is the liquid mercaptan terminated polymer of this invention.

In the reactions designated above in forming the novel liquid mercaptan terminated polymers of this invention the reactants are preferably utilized in stoichiometric amounts, although this is not critical, with one possible exception, and the particular amounts can be varied as found necessary and desirable. However, it should be pointed out that the polyhalogen organic compound should be utilized at least in stoichiometric amounts, and preferably in excess, with respect to the metal alkoxide, in order to insure that halogen groups remain to react with the sulfur containing compound.

In the following examples all parts and percentages, unless otherwise stated, are by weight. The following polymer

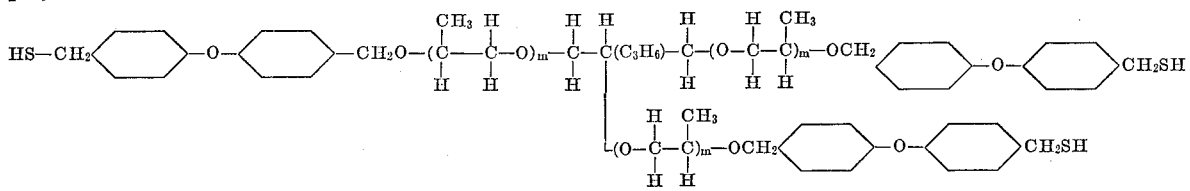

wherein $m$ is equal to 34 (and may range from about 2 to 50), was prepared in the following manner:

Example I.—Preparation of sodium alkoxide

A sodium dispersion was prepared by heating 715 grams of terphenyl (HB–40) to 250° F., stirring in 2.75 grams of aluminum octoate and adding 382 grams of sodium metal on a high speed dissolver. The mass was stirred for about twenty minutes.

To a separate covered and jacketed vessel, there were charged 1,889 grams of polypropylene oxide triol (an adduct of propylene oxide to 1,2,6 hexane triol) of M.W. 5667 (Niax Triol LHT 28) and 72 grams of the previously prepared sodium dispersion. Stirring was maintained for about two hours until the sodium was dissolved. The temperature was carefully controlled so that it would not rise above about 140°–150° F.

Example II.—Preparation of halogen derivative of alkoxide

To the sodium alkoxide prepared in Example I, there were added 240 grams of p,p'-di(chloromethyl) diphenyl oxide (CMDPO–25). The exotherm was kept from rising above 140° F. The reaction of the alkoxide and the halogen compound was complete in about two hours. The reactive halogen intermediate produced was used in the preparation of the mercaptan terminated polyether as set forth below.

Example III.—Preparation of thiouronium chloride salt

To the halogenated derivative of the sodium alkoxide prepared in Example II, there were added 87 grams of thiourea crystals. The mass was heated at 200° F. for 6 hours.

Example IV.—Preparation of mercaptan terminated polyether

The thiouronium salt produced in Example III was hydrolyzed by heating at 200° F. for an additional 2 hours with 40 grams of sodium hydroxide dissolved in 40 grams of water.

The excess caustic was neutralized with concentrated HCl. The product was filtered hot through a filter press.

A yield of 93% at 95% conversion of the theoretical trimercaptan was obtained.

In addition to the polypropylene oxide triol, utilized in the foregoing examples, other polyalkylene oxide polymers having from two to four terminal hydroxyl groups may be utilized in the preparation of the metal alkoxide. Primary as well as secondary alcohols may be used although primary alcohols are preferred since it has been found that secondary alcohols cannot be utilized at temperatures above about 150° F.

Generally speaking, the polyalkylene oxide compounds containing two to four hydroxyl groups are prepared by reacting a polyol compound with a polyalkylene oxide. The polyol utilized in such a reaction can be called an initiating polyol and may be any number of organic compounds such as glycerine, trimethylol propane, and pentaerithrytol.

A variation in the specific initiating polyol varies the number of carbon atoms of R in the formula of the mercaptan terminated polyethers. Thus, if the initiating polyol to form the polyalkylene oxide polymer is glycerine R will have three carbon atoms.

Similarly the polyalkylene oxide which is utilized may, in addition to the polypropylene oxide used in the specific examples above, be polyethylene oxide or polybutylene oxide.

It has been determined by extensive experimentation that any organic compound containing from two to four halogen atoms may be utilized in our invention providing that at least one of the halogen atoms is alpha to an olefinic carbon atom or a compound having olefinic characteristics such as an aromatic compound, e.g. benzene. Specific polyhalogen organic compounds which have been utilized are aromatic compounds such as tri(chloromethyl) and tetra(bromomethyl) diphenyl oxides. Utilizing tetra(bromomethyl) diphenyl oxide the following polymer has been prepared:

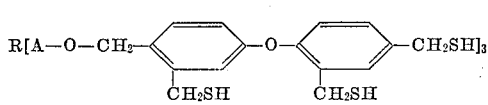

If a polyalkylene oxide containing four hydroxyl groups had been utilized there would have been obtained a polymer having 12 terminal mercaptan groups instead of nine. Other aromatic compounds which have been utilized to good effect in this invention are dichloromethyl benzene, m-dichloromethyl toluene, dichloromethyl durene, o-di- (bromomethyl) benzene, and 1-chloromethyl-3-β-chloroethyl benzene.

Other aromatic compounds useful in the present invention are disclosed in United States Patent 2,291,528, issued July 28, 1942. This patent discloses halomethyl substituted aromatic ethers such as di(chloromethyl) phenoxyethoxyethyl chloride, chloromethyl - o - chlorophenoxyethoxyethyl chloride, p-cyclohexyl chloromethyl phenoxyethoxyethoxyethyl chloride, tetra(chloromethyl)-phenoxyethoxyethoxyethyl sulfide, and the like. All of the compounds exemplified in this patent can be utilized as the polyhalogen organic compound reactant.

Polyhalogenated aliphatic compounds which have also been utilized in the present invention are 1,4-dichlorobutene-2; 1-bromo-5-chloropentene - 2; and 1,6-dichlorohexene-2. Utilizing 1,4-dichlorobutene-2 we have prepared a halogen intermediate of the following formula:

$$R[A\!-\!\!O\!-\!\!CH_2\!-\!\!CH\!=\!\!CH\!-\!\!CH_2Cl]_3$$

wherein R and A have the meanings hereinbefore designated.

The above polymer can in turn be reacted with a sulfur containing compound so that the chloro atom is replaced by a mercaptan group.

Suitable sulfur containing compounds are thiourea and substituted thioureas such as lower alkyl thioureas. These thioureas react with the halogenated intermediates of this invention in the following manner:

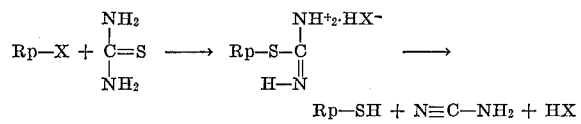

Of course, the hydrogen atoms attached to either of the nitrogens can be replaced by any suitable group such as lower alkyl radicals.

In addition to thioureas and substituted thioureas other sulfur containing compounds usable in the present invention are hydrogen sulfide and alkali metal salts thereof. If hydrogen sulfide or a salt thereof (e.g. an alkali metal salt such as sodium) is utilized then it is not necessary to hydrolize the reaction product because a mercaptan terminated polymer is formed per se.

Of particular interest are mercaptans and alkali metal salts thereof in which the donor sulfur is attached to a group which is readily removable by hydrolysis, such as

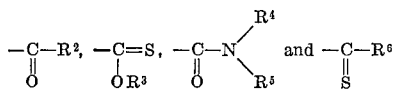

wherein $R^2$ and $R^6$ are lower alkyl radicals and $R^3$, $R^4$ and $R^5$ are either hydrogen or lower alkyl radicals. Thus, compounds which are useful in the present invention are sodium thiocarbamate, potassium ethyl xanthate and thiolacetic acid.

If hydrolysis is necessary in the production of the mercaptan terminated polyethers of this invention the hydrolysis may be accomplished with any suitable alkaline or acidic compound. Upon completion of hydrolysis and neutralization, the product may be filtered hot through a filter press. Instead of filtration, there may be added hot or cold water, if desired, to dissolve all the soluble byproducts and the material may then be centrifugally separated. Small additions of plasticizers or solvents may also be made, if desired, to increase processing ease.

The mercaptan terminated polyethers of the present invention, which may be cured to rubbery elastomers, may vary in molecular weight from about 1,000 to about 15,000 and higher. For example, a preferred polymer prepared from di(chloromethyl) diphenyl oxide as set forth above has a molecular weight of about 7,500. The viscosity of the polyethers may vary from about 50 centipoises to about 100,000 centipoises.

The liquid polyethers may be used with soluble curing agents in the impregnation of leather, fabrics and wood. They may be cured to a material having the characteristics of a rubbery elastomer. The polyethers may be compounded with fillers, reinforcing pigments and modifying resins and plastics and may be used as sealants, casting compounds, coatings and adhesives. For example, they may be used as sealants between metal surfaces, in the pressurization of aircraft, as sealants in air and gas ducts, as protective linings in gasoline reservoirs and containers, as adhesives, and in many other useful applications.

The physical and chemical properties of the cured composition may be varied to produce a product best suited to the methods of application and the specific use to which it is to be applied by addition thereto of fillers, pigments, reinforcing agents, resins, plasticizers and the like. These may be blended into the liquid polymers on a suitable mill such as a roller mill or paint mill and the curing agent thereafter incorporated in any suitable manner.

The mercaptan terminated polyethers may be cured with a wide variety of curing agents and may be employed in conjunction with different types of curing systems. They may, for example, be utilized in systems wherein cure is initiated just prior to use by adding a curing agent such as an oxidizing agent, e.g. lead dioxide or zinc peroxide, to a base polymer previously separately compounded with fillers, reinforcing pigments etc. and thoroughly mixing the curing agent therewith. Alternatively, the base polymer composition may be premixed with the curing agent under anhydrous conditions and then, immediately prior to use, a solvent such as water or an organic compound, is added and mixed with the premixed composition. See for example United States Patent No. 2,466,963 to Joseph C. Patrick and Harry R. Ferguson and No. 2,787,608 to George Gregory and Irvin P. Seegman.

The polyethers of the present invention may be used most advantageously in a one-part stable hygroscopic liquid composition which can be completely cured without agitation, in accordance with the method disclosed in United States Patent No. 3,225,017 to Irvin P. Seegman, Lester Morris and Paul A. Mallard.

In a one-part system, there is thoroughly dispersed within the polymer a dormant curing agent for the polymer which is activated by the presence of moisture. Similarly, there is thoroughly dispersed within the polymer a water-soluble deliquescent accelerating agent adapted to attract and absorb moisture from the surroundings and to hasten the curing of the polymer by the curing agent. The polymer may be initially dried to remove any moisture or, preferably, the deliquescent accelerating agent may also be a dessicating agent to dry the polymer. Alternatively, the polymer may have thoroughly dispersed therein a single dessicating, deliquescent, dormant curing and accelerating agent which is adapated to dry the polymer, to attract and absorb moisture from the surroundings, to cure the polymer when activated by the presence of moisture and to hasten the curing of the polymer. Such surroundings may include a body of water or a body of gas containing essentially only moisture such as atmospheric air of normal humidity.

By simply depositing the present composition in place and then curing solely by contact of its surface with surroundings containing essentially only moisture, the mixing step and mixing equipment required in prior curing methods are eliminated and the formation of air bubbles in the cured elastomer which would result from a mixing step is precluded. In addition, the composition may be packaged in a single suitable container and applied directly to the place where it is used. After deposition in place, even thick bodies of composition may be cured merely by contact with atmospheric air without the addition of separate curing agents.

The deliquescent accelerating agent is preferably a desiccant and must be water-soluble. It may be present in amounts ranging from 0.5 to 50 parts per 100 parts by weight of the polymer. It has been found that alkaline materials such as alkali metal and alkaline earth metal oxides, peroxides, hydroxides and salts of weak acids have such useful characteristics. Some specific examples of compounds which may be used for such purpose are sodium oxide, sodium peroxide, potassium hydroxide, sodium hydroxide, sodium acetate, sodium carbonate, sodium phosphate, sodium molybdate, calcium oxide, barium oxide, calcium peroxide, barium peroxide, calcium hydroxide and strontium hydroxide. In addition, it has been found that barium oxide is unexpectedly unusually effective as a desiccating, deliquescent accelerating agent. It has also been found that alkali metal and alkaline earth metal peroxides, such as sodium peroxide, calcium peroxide and barium peroxide may be used as single desiccating, deliquescent, curing and accelerating agents.

Among the many curing agents which may be used are organic oxidizing agents such as dinitro benzene; inorganic oxides including the alkali metal and alkali metal salt peroxides, such as sodium peroxide, sodium pyrophosphate peroxide, sodium carbonate peroxide and sodium perborate; the alkaline earth metal peroxides such as calcium peroxide and barium peroxide; and other metal oxides and peroxides such as manganese dioxide and zinc peroxide.

It has been found that certain curing agents are extremely effective particularly in the production of cured elastomers and thioplasts capable of withstanding prolonged exposures to temperatures as high as 350° F. without heat softening or material change in other properties. Such curing agents comprise the group of soluble salts of chromic acid such as chromates, bichromates and trichromates including the sodium, potassium and ammonium chromate, and bichromate salts. Any soluble salt of chromic acid which, upon solution, liberates anions containing chromium may be used in this invention. Such salt should preferably have a solubility in the solvent equal to or greater than that of potassium bichromate, i.e. about 12 grams per 100 ml. of water at 20° C. Other chromates include lithium, rubidium, cesium, magnesium and calcium chromate and bichromates, potassium chlorochromate, ferric bichromate, strontium bichromate and the bichromates of zinc, copper, cobalt and nickel. Organic chromates include tertiary butyl chromate and bichromate, and guanidine chromate and bichromate. Trichromates include sodium, potassium and strontium trichromate.

The curing agents should be used at least in stoichiometric amounts but may range from about 3 parts to about 20 parts per 100 parts by weight of polyether, and more preferably from about 3 to 10 parts per 100 parts by weight of polyether. A cured composition resulting from the use of polyethers with a curing agent alone may contain as high as about 97% by weight of the polyether. The amount of solvent, when present, is generally about 2 to 5 parts per 100 parts polymer by weight, with water generally being in the lower end of this range. The polyether content in compositions containing fillers, pigments, resins, plasticizers, curing agents, etc. may range from about 40% to 97% by weight.

The addition of and increase in amount of fillers, pigments and reinforcing agents such as calcium carbonates, iron oxide, aluminum powder, silicon dioxide, clays, zinc sulfide, carbon black, rayon floc, titanium dioxide, etc., will, in general, increase the Shore hardness, toughness and tensile strength and decrease elongation of the product.

The adhesiveness of the cured composition to metals, glass, resin-coated objects, etc. may be greatly increased without destruction of other properties by the addition of various resinous or plastic compositions generally in the ratio of 1 to 20 parts per 100 parts of the polymer by weight although as high as 50 parts may be used. Due to their resistance to heat, water and to chemicals, the phenolic and epoxy resins are the preferred resins for this purpose for use with the compositions of this invention.

Other additives which may be used in the composition of the present invention include plasticizers, such as chlorinated diphenyls. These compounds increase the fluidity of the composition and improve the dispersion of the solids. Plasticizers also improve elongation and reduce the hardness of the cured composition.

EXAMPLE V

| One-part sealant | Parts by wt. | Parts by wt. |
|---|---|---|
| Polyether [1] | | 100 |
| Polyether [2] | 100 | |
| Calcium carbonate | 30 | 50 |
| Titanium dioxide | 18 | 25 |
| Carbon black dispersion | 0.95 | |
| Arochlor 1254 [3] | 35 | 35 |
| Barium Oxide | 5 | 5 |
| Calcium peroxide | 11 | 11 |
| Toluene | 5 | 3 |
| Epon 1001 [4] | 5 | 5 |

[1] Prepared as in Examples I to IV, filtered.
[2] Prepared as in Examples I to IV, water washed instead of filtered.
[3] A chlorinated diphenyl produced by Monsanto Chemical Co.
[4] 80% solution in methyl ethyl ketone of an epoxy resin produced by Shell Chemical Co.

All ingredients were mixed in a paint mill and the resulting composition was loaded into sealed cartridges suitable for use in a standard extrusion gun. At intervals, as desired, some of the cartridges extruded into test panels. The material cured into rubber-like compositions. The following results were obtained:

| | | |
|---|---|---|
| Brookfield viscosity (Spindle No. 7 at 2 r.p.m.) | 9,440 poises | 10,000 poises. |
| Tack-free time [5] | 8 hours | 16 hours. |
| Cured 24 hrs. at 120° F. and 100% relative humidity. | ¼" depth Rex 24.[7] | ⅛" depth Rex 15.[8] |
| After hardening (Rex hardness after 48 hrs. at 158° F.) | Rex 29 | Rex 20. |
| Adhesion to 6061 aluminum [6] | 2 lbs | 6 lbs. |
| Cured 24 hrs. at 120° F. and 100% relative humidity. | Adhesive | Low level cohesive. |

[5] MIL-S-7502.
[6] MIL-S-7502 peel test.
[7] Equivalent to Shore A hardness of about 28.
[8] Equivalent to Shore A hardness of about 19.

The cure rate compares with a cure rate of about 72 hours obtained with polysulfides under similar conditions.

The after-hardening rise is slight compared to the rise of from 15 to 30 in hardness normally obtained with typical polysulfide-based formulations.

Example VI.—Two-part potting compound and industrial sealant

| | Parts by wt. |
|---|---|
| Polyether (prepared as in Examples I to IV) | 100 |
| Stearic acid | 0.06 |
| Zinc stearate | 0.07 |
| Lead peroxide, technical | 14.80 |
| Barium oxide | 6.00 |
| Water | 2.00 |

Cure time (MIL-S-7502)—15 minutes
Shore A hardness (MIL-R-2065)—15
After-hardening (Shore A hardness after 48 hrs. at 158° F.)—20
Water absorption, 24 hours—2%

The rise in after-hardening of this formulation was also very small compared to that obtained with polysulfides. The results also show that the water resistance of the polyether formulation is as high as the polysulfides.

Example VII.—Two-part potting compound and primary sealant

| | Parts by weight |
|---|---|
| Base: | |
| Polyether (prepared as in Examples I to IV) | 352 |
| Carbon black | 54 |
| Liquid coal tar | 580 |
| Water | 43 |

Accelerator:
  Liquid coal tar _____ 668
  Carbon black _____ 227
  Sodium dichromate _____ 77
  Sulfur _____ 3
  Water _____ 54

Application life (MIL–S–7502)—40 minutes
Shore A hardness (MIL–R–3065)—35
After-hardening (Shore A hardness after 48 hrs. at 158° F.)—40
Adhesion (Interim Federal Spec. SS–S–00200A)—60 p.s.i.
Fuel extraction (Interim Federal Spec. SS–S–00200A)—+2.29%
Resilience (Interim Federal Spec. SS–S–00200A)—96%

The resilience compares with about 70% resilience normally obtained with polysulfide formulations.

The after-hardening rise in these types of formulations was also very small compared with polysulfides.

It will be understood that the foregoing description and examples are only illustrative of the present invention and it is not intended that the invention be limited thereto. Various modifications and alterations of the present invention may be made without departing from the spirit thereof and the scope of the appended claims.

We claim:
1. Mercaptan terminated polyethers having the formula $R-[A-O-B(SH)_{m-1}]_n$ wherein R is lower alkyl having from 2 to 6 carbon atoms, A is polyalkylene oxide having from 2 to 4 carbon atoms, the number of repeating alkylene oxide units ranging from about 2 to 200, B is an aliphatic or aromatic radical having an olefinic carbon atom or an aromatic ring alpha to the oxygen atom, m is an integer ranging from 2 to 4, and n is an integer ranging from 2 to 4.

2. A method of producing mercaptan terminated polyethers which comprises reacting a polyalkylene oxide having from 2 to 4 primary or secondary hydroxyl groups with a member selected from the group consisting of an alkali metal and an alkali metal hydride in dispersion to form an alkali metal alkoxide, mixing the alkoxide with an aliphatic or an aromatic compound having from 2 to 4 halogen atoms, at least one of the halogen atoms attached to a methylene group and located alpha to an olefinic carbon atom or an aromatic ring and maintaining the temperature of the resulting exothermic reaction to below about 150° F., reacting the thus formed halogen derivative with a sulfur-containing compound selected from the group consisting of thiourea, substituted thiourea, hydrogen sulphide, salts of hydrogen sulphide, mercaptans, and mercapto salts in which the donor sulfur is attached to a group which is readily removable by hydrolysis to produce a sulfur containing salt, hydrolyzing the sulfur containing salt with an alkaline compound and neutralizing excess alkalinity with an acidic compound.

3. A method according to claim 2 wherein the group removable by hydrolysis is selected from the group consisting of

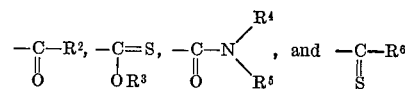

wherein each of $R^2$ and $R^6$ are lower alkyl and $R^3$, $R^4$, $R^5$ are selected from the group consisting of hydrogen and lower alkyl.

References Cited

UNITED STATES PATENTS

| | | | |
|---|---|---|---|
| 3,211,651 | 10/1965 | Elliott et al. | 252—46.7 |
| 3,225,017 | 12/1965 | Seegman et al. | 260—79.1 |
| 3,334,147 | 8/1967 | Brunelle et al. | 260—611 |
| 3,361,723 | 1/1968 | Ephraim | 260—79 |
| 3,431,239 | 3/1969 | Morris et al. | 260—48 |

DONALD E. CZAJA, Primary Examiner

M. I. MARQUIS, Assistant Examiner

U.S. Cl. X.R.

260—18, 28, 33.8, 47, 52, 61, 609, 611, 830